July 11, 1967  R. H. KIRKHOF  3,330,423
STACKING DEVICE

Filed Jan. 13, 1965  3 Sheets-Sheet 1

INVENTOR.
RUSSEL H. KIRKHOF
BY
ATTORNEYS

INVENTOR.
RUSSEL H. KIRKHOF
BY
ATTORNEYS

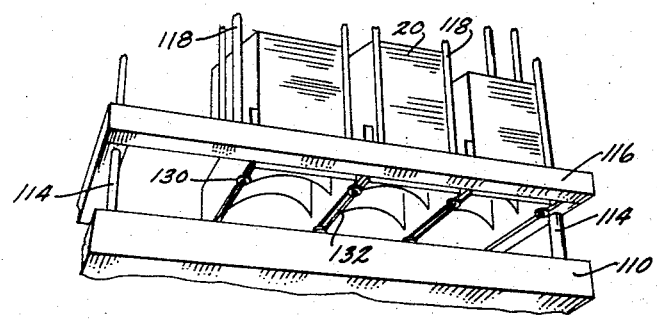
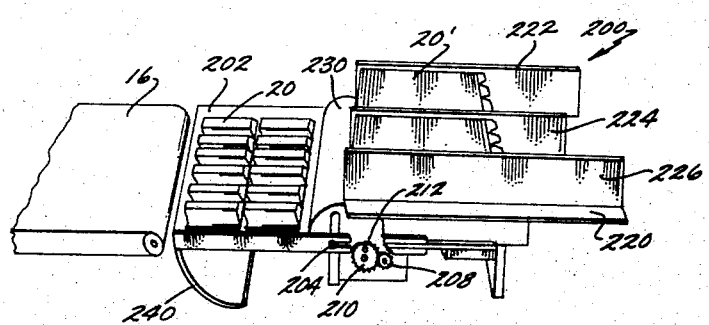
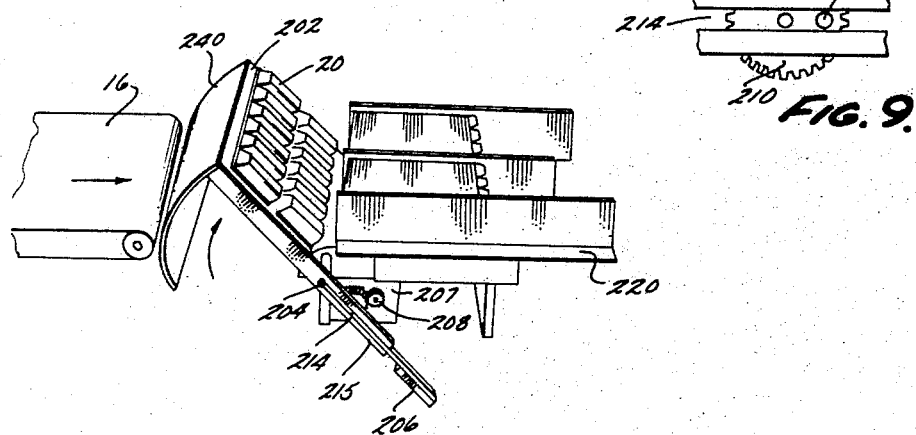

United States Patent Office 3,330,423
Patented July 11, 1967

3,330,423
STACKING DEVICE
Russel H. Kirkhof, Marne, Mich., assignor to Kirkhof Manufacturing Corporation, Grand Rapids, Mich., a corporation of Michigan
Filed Jan. 13, 1965, Ser. No. 425,195
5 Claims. (Cl. 214—6)

This invention relates to automatic stacking apparatus, and more particularly to apparatus for stacking formed polymeric articles, especially pressure differential formed plastic containers.

This invention has special usefulness in relation to equipment for automatically forming plastic articles from a continuous sheet by pressure differential, and therefore will be explained chiefly with respect thereto.

High speed apparatus capable of pressure forming thousands of formed articles such as plastic trays or containers in a relatively short time has been developed by the assignee herein, for example that shown in U.S. patent application Ser. No. 160,057, entitled Forming Press, now Patent No. 3,166,790 assigned to the assignee herein. The articles are creased but not separated from the web in the press, and are broken out and separated from the web after leaving the press. The rapidly separated trays are conventionally picked up and manually stacked by workers standing along opposite sides of the conveyor. Manual stacking is not only costly, but results in non-uniform stacks. The use of an automatic de-stacker is therefore not advisable with manually formed stacks since the stacks vary so much.

Conceivably, uniform stacks could be obtained with a mechanical stacker. Mechanical stacking of the flexible thin walled polymeric articles presents many problems, however. The articles, when broken out of the sheet, tend to jump up or sideways or both. Further, if not exactly aligned with the stack, the articles will crush and cause a serious bottleneck.

The easily crushed, flexible nature of the formed plastic articles renders them highly susceptible to crushing if stacked by a machine. Yet, for the articles to be uniformly stacked, they must be pressed together. Further they should be pressed together with the same pressure each time to obtain uniform stacks which can be effectively de-stacked by conventional de-stacking equipment at the place of use. When stacked by hand, the articles are gently treated so as not to be crushed, but the stacks are not uniform.

It is an object of this invention to provide a stacking apparatus capable of receiving formed articles, especially pressure differential formed, plastic articles of thin walled, flexible construction, and stacking them rapidly in uniform stacks.

It is another object of this invention to provide stacking apparatus for thin-gaged flexible plastic articles, capable of receiving several rapidly moving rows of articles simultaneously, and stacking them on a special timed relation and without crushing the articles.

Still another object of this invention is to provide a reciprocating plastic container stacking apparatus that automatically interfits the tray in exact alignment with the stack to thereby prevent tray crushing.

An object of this invention is to provide apparatus which receives plastic articles formed from a sheet, and stack them in uniform stacks with constant spacing between articles in the stack, yet to do this automatically and at high speeds for mass production output, even though the articles are formed in several rows at a time.

These and several other objects of this invention will become apparent upon studying the following specification in conjunction with the drawings in which;

FIG. 6 is a fragmentary perspective end view of the stacker showing the undersides of the stacks when the two elements of the stacker are separated as in FIG. 3;

FIG. 7 is a perspective view of a second form of stacker;

FIG. 8 is a perspective view of the stacker in FIG. 7, shifting to stack articles; and FIG. 9 is an enlarged fragmentary elevational view of the pivoted drive elements.

Figure 1:
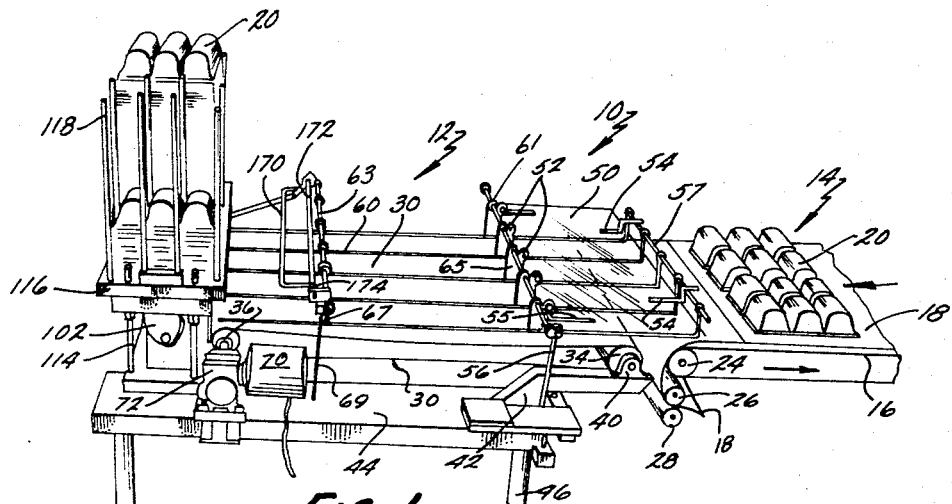
FIG. 1 is a perspective view of the novel apparatus shown associated with the discharge end of the forming press conveyor.

Referring now specifically to the drawings, the complete assembly 10 includes the stacking assembly 12 and the forming press discharge conveyor 14 cooperative therewith.

The forming machine discharge conveyor 14 has a belt 16 which carries the continuous thermo-plastic sheet 18 from which articles 20 such as the container trays shown have been formed in rows. In the illustrative articles shown, each includes theree concavities to hold cookies, for example. As noted in FIG. 1, these articles are not yet separated from film 18 when emerging from the press, but are connected by a crease or groove as taught and claimed in the above-identified patent application assigned to the assignee herein. As the plastic film is pulled around the end of conveyor idler pulley 24 by a pair of rotating squeeze rolls 26 and 28, it changes direction. The brittle crease surrounding the formed articles, which themselves are then quite inflexible as a unit, cracks at the leading edge as the sheet bends. The article then separates back from the leading edge as the sheet continues to move. The article moves straight past pulley 24 onto feed belt 30 for the stacker. A separator plate 32 positioned adjacent the end of conveyor 24 and recessed slightly below its level, assures complete separation of the articles from the sheet. Belt 30 extends around drive pulley 36 and idler pulley 34. Pulley 34 is mounted on a pair of end bearings 40 attached to the stacker assembly framework 42. This frame includes a platform 44 on legs 46.

Figure 2:
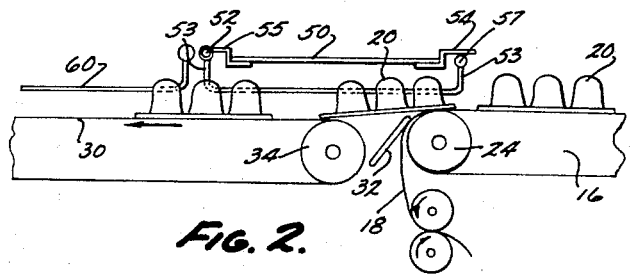
FIG. 2 is a side elevational enlarged fragmentary view of the juncture of the two conveyors in FIG. 1.

The plastic containers 20 are formed in the forming press in a series of rows for mass production output. Thus for example as illustrated in FIG. 1, four rows of articles are travelling along the conveyor towards the stacking apparatus. The stacking apparatus is adapted to cooperate with the particular forming press to receive the same number of rows of articles. Thus as viewed in FIG. 1, for example, the stacking subassembly 12 includes a plurality of spaced parallel horizontal row-forming rods 60 which extend longitudinally above belt 30 at a height less than the height of the articles (FIG. 2) to maintain the articles in their respective rows as they are conveyed. Actually it is necessary to align the articles while they are still on the conveyor 16 from the forming press, and to maintain them aligned laterally as they make the transfer from this conveyor to the feed conveyor for the stacker. Thus, a special bracket assembly including a pair of upright rods 56 on opposite sides of conveyor belt 30 is provided. Mounted to the upper ends of the rods and suspended therebetween is a transverse bar 61. Suspended in cantilever fashion from this bar, and affixed thereto by a plurality of brackets 52, is a plurality of generally U-shaped, elongated rods 53 (FIG. 2). The cross leg of each of these U-shaped rods is elongated, and aligned with rods 60 to effectively extend the guide tracks across the junction between conveyors. These are spaced, like rods 60, parallel to the conveyor belt but above them less than the height of the articles 20 to retain them in aligned condition.

Rods 60 are also suspended from the pair of transverse rods 61 and 63 by suspension brackets 65 and 67 respectively. Rod 63 is mounted between a pair of upright bars 69 on opposite sides of belt 30. These bars, like bars 56, are attached to platform 44.

Not only must the articles be laterally retained during their break out and transfer, but they must also be vertically contained. As they break loose from the sheet, the articles tend to jump vertically up. If unrestrained they can jump diagonally to become askew at various random orientations. To vertically retain them is the function of overlying plate 50, as of plastic, which overlaps the conveyors also. It is mounted to rods 61 and 57 by brackets 55 and 54.

Figure 5:
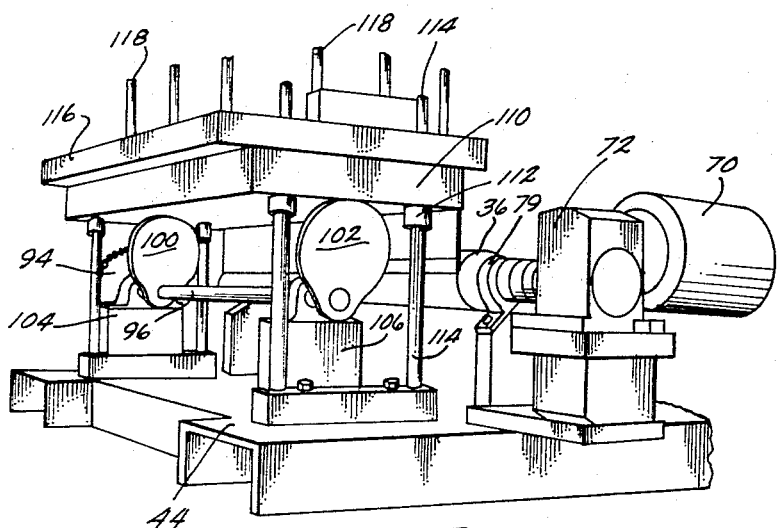
FIG. 5 is a fragmentary enlarged perspective view of the apparatus in FIG. 1, showing the underside of the stacker from the direction viewed in FIG. 1 and on the opposite side from the side shown in FIGS. 3 and 4.

The retained, aligned articles are advanced to the stacker by belt 30. The pulley 36 for belt 30 is driven by an electrical motor 70 and its gear box 72 (see FIG. 1). The gear box output shaft is connected to the pulley through bearing 79 (FIG. 5). Also operated indirectly by this motor is the cam lifting mechanism for the stacker, and the gate actuating mechanism.

More specifically, on the end of pulley 36 opposite the gear box 72 is a support bearing 80 (FIG. 3) affixed to a rigid mount 82 extending upwardly from platform 44. On the extended end shaft of the pulley is a spur gear 86. This engages with a second gear 88 mounted on a rotational axle 90. On the same axle is a smaller spur gear 92 which in turn meshes with gear 94 on axle 96. Also mounted on axle 96 is a pair of spaced, like, eccentric cams 100 and 102 (FIG. 5). This transverse axle 96 is supported by a pair of pillow blocks 104 and 106 adjacent the cams. The cams are at the opposite ends of the underside of platform 110.

The platform has four bearing sleeves 112 mounted slidably on vertical guide posts 114 at the four corners of the platform and affixed at their lower end to framework 44. Thus, rotation of axle 96 causes cyclic raising and lowering of platform 110 at the end of the conveyor belt 30. This raises it from its lowered position illustrated in FIG. 3 to the elevated position illustrated in FIG. 4.

In this elevated position, it moves into operative engagement with the upper fixed platen 116. This upper platen is actually a peripheral, rectangularly shaped, ring with openings through which the individual articles can be passed upwardly into the stacker. Extending up from this upper platen is a plurality of stack retaining vertical rods 118 parallel to each other and forming individual stack retainers aligned with the respective rows of article tracks on the conveyor. Here, in the illustrative example, there are four rods on each side of each stack to be formed, and there are four stacks.

Figure 3:
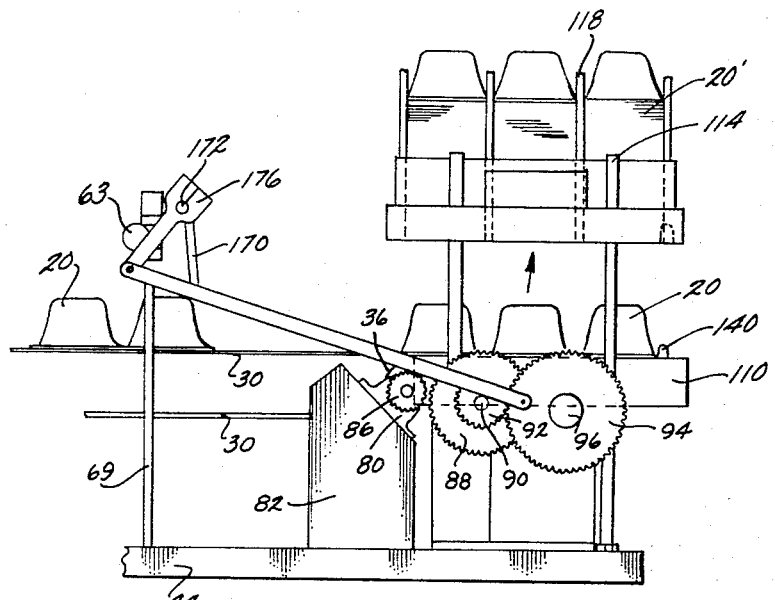
FIG. 3 is a fragmentary side elevational view of the stacking apparatus in FIG. 1, taken from the opposite side as FIG. 1, and shown with a tray just about to be stacked.

Vertical reciprocation of platform 110 with rotation of cams 100 and 102 raises four formed articles 20 on the platform (FIG. 3) up into engagement with the underside of the previously stacked articles in stacks 20' (FIG. 3). (Only one stack is visible in FIG. 3, with each article in the stack having three humps.) This presses the articles into stacking relation the underside of the stacks while raising the stacks that much. Each lightweight article is retained in engagement with the stack by frictional engagement between the surfaces. The stack is held up by a plurality of bottom engaging discs 130 shown in FIG. 6. These discs are mounted by screws or the like to the elongated ribs 132 that extend across the rectangular ring 116 between the stacks and in alignment with bars 60 to form guide means for the individual articles being pressed up through platen 116. As shown in FIG. 6, three of these transverse ribs separate the rectangular platen 116 into four respective rectangular openings or receiving mouths to allow formed articles to be pressed upwardly therethrough in aligned relation. The elevated articles pass the discs 130 protruding slightly into the mouths, by slight deflection of the lower edges peripheral of the articles as they are pressed upwardly. When reverting to their original shape, the article periphery or rim abuts the top of these discs to rest upon the discs and prevent falling down again of the entire stack.

The rows of articles 20 conveyed from belt 30 onto the elevating stacking platform 110 are stopped by ridge 140 which also aligns the articles with the stacks. It extends along the backside of platform 110.

Figure 4:
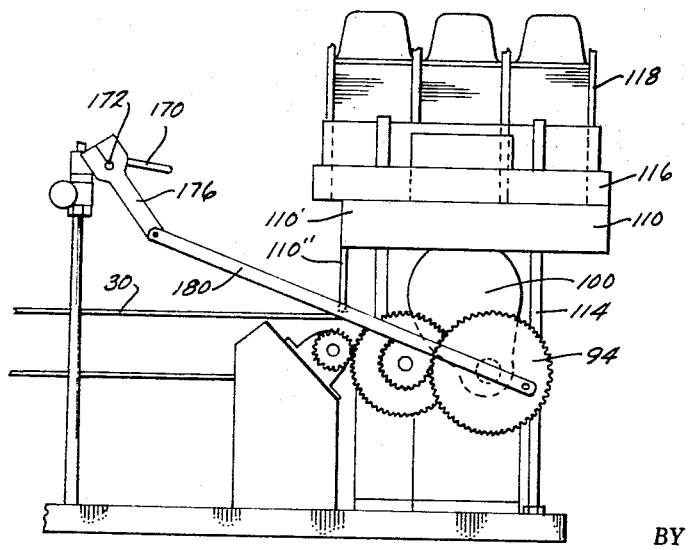
FIG. 4 is a fragmentary side elevational view similar to FIG. 3, showing the tray elevated and stacked.

The front vertical face 110' of platform 110 includes a downward lip extension 110" which forms a continuation of the face. Even when platform 110 is completely elevated as is shown in FIG. 4, this front face area extends downwardly to the level of continuously driven conveyor belt 30 to prevent articles from passing beneath the elevated platform. This face also acts as a gate to prevent articles from passing onto the platform once the platform begins to rise, and until it again reaches the level of belt 30. Thus, any article which is conveyed along belt 30 up to the platform after the platform begins to rise and until it again reaches the level of belt 30 merely presses against face 110' and/or 110" until the platform is coplanar with belt 30 to receive articles transferred up against stop 140 (see FIG. 3).

Since the apparatus moves at high speed, it has been found that this stop face alone is not adequate to prevent articles from being crushed. Specifically, articles which are only partially onto the platform when it begins to rise, will be lifted from engagement with the feed belt, so that they stop in the half loaded condition. The articles are thus crushed between the platens to jam the entire system. This not only ruins these particular articles, but causes a bottleneck in the entire mechanism since subsequent articles will hit these crushed articles and will cause further pile-up.

Therefore a special gating system is used in combination with the front face 110'–110" of the platform. This includes a gate 170 formed, for example, of a U-shaped rod which is elongated transverse to belt 30. It has its upwardly extending legs pivotally mounted at the upper ends with respect to a bracket assembly. More specifically, a transverse pivot axle 172 mounts the upper ends of this gate to a pair of bearing blocks 174 affixed to the upper end of posts 69. This gate must be controllably pivoted up and down in special relation to the platform movements. Its operating mechanism includes an elongated bracket 176 affixed to one end of rod 172 (see FIG. 4), and extending radially therefrom. This acts as a crank for the gates to pivot from its horizontal "pass" position illustrated in FIG. 4, to its vertically downwardly extending "stop" position illustrated in FIG. 3. This movement is achieved through a link 180 having one end mounted off center on gear 94 and the other end pivotally attached to the low end of crank 176. Thus, as gear 94 rotates, link 180 reciprocates as its one end revolves with the gear, to pivot crank 176 back and forth on its axis, and thereby raise and lower gate 170 pivotally. Since gear 94 is mounted on the same shaft as the lift cams 100 and 102, the gate is timed to operate with the lifting cams. This is pre-set so that the gate 170 closes just as platform 110 is approaching its lowered position. It remains closed until the platform rises to a position where face 110' is exposed. Then the gate raises to allow a retained article (FIG. 3) to pass it and move into abutment with face 110'–110". It will be pressed by belt 30 into continuous engagement with face 110'–110" as platform 110 raises and then lowers, so that when the platform lowers to the level of belt 30, the waiting articles will be advanced by belt 30 way onto the platform and up against stop 140. The platform has a momentary dwell just long enough to receive the articles. The dwell is obtained by a small arcuate portion on the heel of the two cams. As the platform then rises again, it raises the articles into stacking relation through ring 116 and into engagement with stacks 20'. The flanges of the plastic articles are deformed momentarily on discs 130 (see FIG. 6). Once above them, they return and rest thereon as platform 110 again drops. As it drops, gate 170 will again move to a closed position so that it will have passed only one set of articles across the four tracks of the belt i.e., four articles in this specific embodiment shown, and retains subsequent articles until they can be safely gated through in special timed relation.

SECOND FORM OF INVENTION

In FIGURES 7 and 8 is illustrated a second form of the invention. It employs a pivotal stacking action, to reciprocate in an arcuate path rather than a linear path as in the first form of the invention.

The complete stacking apparatus 200 cooperates with discharge conveyor 16 from the forming press by having a receiving platform 202 immediately adjacent the conveyor and aligned therewith, in its horizontal position. This platform 202 is pivotally mounted at pivot axis 204 transverse to the conveyor and stacker. It can move from a lower horizontal position (FIG. 7) to a raised vertical position by passing through an arc in the manner shown in FIG. 8. The platform is counterweighted by counterweights 206 on extended arms 215. A pair of intermeshing gears 208 and 210 are driven by a motor-gear box unit 207 to reciprocate the platform. Gear 210 includes a pin 212 projecting laterally therefrom, off center of the gear axis, and engaging in elongated slot 214 of the elongated arms 215 affixed on opposite sides of platform 202. Thus rotation of the gears by the motor can cause depression of arms 215 and corresponding elevation of platform 202 or movement from the horizontal to the vertical position. This shifts the plurality of formed articles loaded onto the platform from their received position into a stacked relation into the bottom of the horizontal stacks 20'. These stacks are maintained aligned by resting on the support surface 220, between panels 222, 224 and 226. Thus, the two articles shown on platform 220 in FIG. 7 will be pressed into the base of the two stacks maintained between the side wall panels. Friction of the stacks on the side walls assures uniform stacking.

During actuation of the platform to pivot it upwardly, the articles are moved through the arcuate path, and maintained in proper relationship to the stacks by resting against an arcuate guide surface 230. This extends in a fixed relation between the horizontal position or platform 202 and the slightly elevated plane of support surface 220, to smoothly guide the arcuately moving articles between these two planes from the horizontal to vertical positions.

Also, to prevent subsequent articles from being pushed off conveyor 16 when platform 202 is being elevated and lowered again, an arcuate restraining plate 240 extends downwardly from the leading end of platform 202. In the elevated position of this platform, this arcuate plate extends ninety degrees beneath the platform to serve as a stop surface for articles on conveyor 16.

In operation, as a plurality of articles are conveyed along discharge conveyor 16 from the forming press, when platform 202 is in its lowered position, one set of articles will be pushed directly from conveyor 16 onto platform 202, into abutment with arcuate guide surface 230 which also acts as a stop. Since the platform is continuously raised and lowered, the received set of articles will be tilted from the horizontal position to the vertical position as it makes the transition between the plane of the conveyor and the plane of support suface 220. They are pressed into the bottom of the stacks, to stack them and shift the stacks slightly. Their frictional engagement between the articles retains them in this condition. In the meantime, articles passing along belt 16 abut surface 240 to be held on the conveyor until the platform again drops. When it does lower, the next set of articles are pushed onto it for stacking. Only one set can move on at a time due to the breadth of the platform from the conveyor to the stack. The platform has a momentary dwell in the horizontal position due to the slight play between the pin 212 and its slot 214 in the horizontal position of the pin (FIG. 9).

The first form of the invention has been found to have some definite advantages over this one. However, this one has some attractive features also. For example, if the articles are not loaded onto the platform as far as they should be, upon tilting of the platform, they slide down into engagement with arcuate stop and guide element 230 to be in exact register with the stacks.

Certain additional advantages to those specifically described herein may occur to those in the art upon studying the foregoing forms of the invention. Also it will be obvious that each of the forms has its own particular characteristics, and, while being related to the other in the broader concept of the invention, has particular advantages of its own for particular usages. It is also conceivable that certain other minor variations in structure could be provided to the two forms of the invention shown, within the concept of the invention. Hence the invention is intended to be limited only by the scope of the appended claims and the reasonably equivalent structures to those defined therein.

I claim:

1. An apparatus for automatically stacking flexible formed polymeric articles comprising: a conveyor to receive and advance articles, and having a discharge end; article guide means above said conveyor, forming a plurality of article guide paths, to maintain articles in column arrangement along the conveyor; a vertically reciprocable platform adjacent said conveyor discharge end; reciprocating drive means in operative relation to said platform to reciprocate it from a lowered position aligned with said conveyor, to a raised position; a plurality of article stack retention means above said platform, aligned longitudinally with said guide paths, and having the lower end thereof adjacent the raised position of said platform to receive articles raised thereon; article guide and stop means on said platform arranged to stop articles from said conveyor in alignment with said stack retention means; and the improvement comprising article flow control gating means in operative relation to said guide means, including a first shiftable gate in said paths, spaced on article length from the leading edge of said platform and operably connected to open with raising of said platform, to control article transfer along said conveyor, and including a second gate on the entry edge of said platform, shiftable to a closed position with raising of said platform, to allow only articles passed by said first gate to transfer to said platform only with lowering thereof to the level of the conveyor.

2. A stacking apparatus for articles formed by a pressure differential into a continuous thermoplastic sheet and connected to the sheet by a thin creased periphery, comprising: a first conveyor to convey the continuous sheet having formed articles therein; a second conveyor aligned with the discharge end of said first conveyor and spaced slightly therefrom; sheet pulling means beneath the level of said first conveyor, generally at the discharge end thereof to pull the sheet between said conveyors in a non-linear path for breaking the articles from the sheet along the creased periphery; the spacing between said conveyors being smaller than the formed articles to cause transfer of the broken out articles to said second conveyor; article alignment means extending lengthwise along said second conveyor, and overlapping said first conveyor to receive articles breaking out of the sheet and maintain them oriented in column form; and reciprocal article stacking means at the discharge end of said second conveyor including means to receive the aligned articles and shift them into a progressively increasing stack.

3. A stacking apparatus for articles formed by a pressure differential into a continuous thermoplastic sheet and connected to the sheet by a thin creased periphery, comprising: a first conveyor to convey the continuous sheet having formed articles therein; a second conveyor aligned with the discharge end of said first conveyor and spaced slightly therefrom; sheet pulling means beneath the level of said first conveyor, generally at the discharge end thereof to pull the sheet between said conveyors in a non-linear path for breaking the articles from the sheet along the creased periphery; the spacing between said conveyors being smaller than the formed articles to cause transfer of the broken out articles to said second conveyor; article alignment means extending lengthwise along said second conveyor, and overlapping said first conveyor to receive articles breaking out of the sheet and maintain them oriented in column form; article retention means overlapping the discharge end of said first conveyor and the receiving end of said second conveyor, spaced above said conveyors slightly more than the article height, to cooperate with said alignment means and assure proper orientation of the articles as they break out of the sheet and transfer to the second conveyor; and reciprocal article stacking means at the discharge end of said second conveyor including means to receive the aligned articles and shift them into a progressively increasing stack.

4. A stacking apparatus for articles formed by a pressure differential into a continuous thermoplastic sheet and connected to the sheet by a thin creased periphery, comprising: a first conveyor to convey the continuous sheet having formed articles therein; a second conveyor aligned with the discharge end of said first conveyor and spaced slightly therefrom; sheet pulling means beneath the level of said first conveyor, generally as the discharge end thereof to pull the sheet between said conveyors in a non-linear path for breaking the articles from the sheet along the creased periphery; the spacing between said conveyors being smaller than the formed articles to cause transfer of the broken out articles to said second conveyor; article alignment means extending lengthwise along said second conveyor, and overlapping said first conveyor to receive articles breaking out of the sheet and maintain them oriented in column form; article retention means overlapping the discharge end of said first conveyor and the receiving end of said second conveyor, spaced above said conveyors slightly more than the article height, to cooperate with said alignment means and assure proper orientation of the articles as they break out of the sheet and transfer to the second conveyor; said alignment means forming a plurality of like article paths; a vertically reciprocable platform adjacent said conveyor discharge end; reciprocating drive means in operative relation to said platform to reciprocate it from a lowered position aligned with said conveyor, to a raised position; a plurality of article stack retention means above said platform, aligned with said guide paths and having the lower end thereof adjacent the raised position of said platform to receive articles raised thereon; article guide and stop means on said platform arranged to stop and align articles from said conveyor with said stack retention means; and article flow gating means in operative relation to said guide means, including a first shiftable gate in said paths, spaced one article length from the leading edge of said platform and operably connected to open with raising of said platform, to control article transfer along said conveyor, and including a second gate on the entry edge of said platform, shiftable to a closed position with raising of said platform, to allow only articles between said gates to transfer to said platform with lowering thereof to the level of said second conveyor.

5. An apparatus for automatically stacking formed articles comprising: a conveyor to receive and advance articles and having a discharge end; guide means along said conveyor, forming a plurality of guide paths, to maintain the articles in column arrangement; a vertically reciprocable platform adjacent said conveyor discharge end; reciprocating drive means in operative relation to said platform to reciprocate it from a lowered position aligned with said conveyor, to a raised position, and including rotating cam means operably associated with said platform and drive means therefor; a plurality of article stack retention means above said platform, aligned with said guide paths and having receiving mouths in the lower end thereof adjacent the raised position of said platform to receive articles raised thereon; article stop means on said platform to orient articles from said conveyor with said mouths; and the improvement comprising article flow gating means in operative relation to said column guide means, including a first gate in the column path, spaced one article length from the leading edge of said platform, said first gate being shiftable from a first article stop position to a second article pass position, a drive linkage from said rotating cam drive means to said first gate to shift it in synchronism with platform shifting, so as to open for article passing with raising of said platform, and to close for article stoppage with lowering of said platform, and a second gate on the entry edge of said platform, shiftable to a stop position with raising of said platform while said first gate opens, and to a pass position with platform lowering to allow transfer to said platform only of articles between said gates.

References Cited
UNITED STATES PATENTS

| | | | |
|---|---|---|---|
| 768,104 | 8/1904 | Wieda | 214—6 |
| 1,292,635 | 1/1919 | Parker | 214—6 |
| 1,874,669 | 8/1932 | Wagner | 214—6 |
| 2,701,651 | 2/1955 | Comstock | 214—7 |
| 2,721,683 | 10/1955 | Pottle | 214—6 |
| 2,756,996 | 7/1956 | Luehrs | 214—6 |
| 2,851,172 | 9/1958 | Seragnoli | 214—7 |
| 2,949,179 | 8/1960 | Busse | 214—6 |

FOREIGN PATENTS

| | | |
|---|---|---|
| 221,901 | 11/1957 | Australia. |
| 680,848 | 2/1964 | Canada. |
| 102,162 | 8/1962 | Netherlands. |

GERALD M. FORLENZA, *Primary Examiner.*

J. E. OLDS, *Assistant Examiner.*